(12) United States Patent
Astinov et al.

(10) Patent No.: US 12,469,509 B2
(45) Date of Patent: Nov. 11, 2025

(54) VOICE AVATARS IN EXTENDED REALITY ENVIRONMENTS

(71) Applicant: Meta Platforms Technologies, LLC, Menlo Park, CA (US)

(72) Inventors: Lyubomir Astinov, Dublin, CA (US); Rayyan Jaber, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 300 days.

(21) Appl. No.: 18/295,763

(22) Filed: Apr. 4, 2023

(65) Prior Publication Data
US 2024/0339121 A1  Oct. 10, 2024

(51) Int. Cl.
*G10L 21/007* (2013.01)
*G06F 3/16* (2006.01)
(Continued)

(52) U.S. Cl.
CPC ............ *G10L 21/007* (2013.01); *G06F 3/165* (2013.01); *H04L 63/0421* (2013.01); *G06Q 30/0641* (2013.01)

(58) Field of Classification Search
CPC ..... G02B 30/56; G06F 1/1637; G06F 3/0304; G06F 3/041; G06F 3/0481; G06F 3/0482; G06F 3/1454; G06F 3/165; G06F 3/167; G06F 16/64; G06F 1/1626; G06N 3/04; G06N 20/00; G06Q 10/10; G06Q 30/0641; G06Q 20/3821; G06Q 40/04; G06T 11/00; G06T 13/00; G06T 13/40; G06T 11/20;
(Continued)

(56) References Cited

U.S. PATENT DOCUMENTS

| 6,339,756 B1 * | 1/2002 | Hinderks | H04B 1/665 |
| | | | 704/201 |
| 6,675,145 B1 * | 1/2004 | Yehia | G06T 11/20 |
| | | | 704/E21.02 |

(Continued)

FOREIGN PATENT DOCUMENTS

WO   2008130398 A1   10/2008

OTHER PUBLICATIONS

Respeecher., "How to Create AI Voices that are Better than Text-to-Speech," Sep. 13, 2022, 5 pages, Retrieved from the Internet: URL: https://www.respeecher.com/blog/how-to-create-ai-voices-that-are-better-than-text-to-speech.

(Continued)

*Primary Examiner* — Gerald Gauthier
(74) *Attorney, Agent, or Firm* — Greenberg Traurig, LLP

(57) ABSTRACT

In one embodiment, a method includes accessing a first voice avatar associated with a first user, wherein the first voice avatar comprises a first description of a first audio processing chain to transform voice inputs; receiving a first voice input from a first client system of the first user; processing the first voice input to generate a first transformed audio corresponding to the first voice input, wherein the first voice input is processed by one or more audio processors, wherein the one or more audio processors are constructed based on the description of the first audio processing chain from the first voice avatar; and sending the first transformed audio to one or more second client systems of one or more second users for playback.

18 Claims, 9 Drawing Sheets

(51) Int. Cl.
*H04L 9/40* (2022.01)
*G06Q 30/0601* (2023.01)

(58) Field of Classification Search
CPC ...... G06V 10/143; G09B 5/062; G09B 19/00;
G10L 13/00; G10L 13/033; G10L 13/08;
G10L 13/205; G10L 13/40; G10L 15/04;
G10L 15/26; G10L 19/125; G10L 21/003;
G10L 21/007; G10L 21/013; G10L 25/63;
G10L 13/10; G10L 19/00; G10L 19/0018;
G10L 21/00; G10L 21/028; H04L
63/0421; H04L 67/131; H04L 43/0852;
H04L 49/9023; H04R 1/326; H04N
7/157; H04N 21/42203; H04N 21/44;
H04N 21/44008; H04S 7/305; H04S
1/002; A61B 5/389; H04B 1/665; H04M
3/2218; H04M 3/42221

See application file for complete search history.

(56) References Cited

U.S. PATENT DOCUMENTS

| | | | | |
|---|---|---|---|---|
| 6,910,005 | B2* | 6/2005 | Bartosik | H04M 3/42221 |
| | | | | 704/E15.047 |
| 7,228,280 | B1* | 6/2007 | Scherf | G06Q 20/3821 |
| | | | | 709/236 |
| 7,830,862 | B2* | 11/2010 | James | H04L 49/9023 |
| | | | | 370/335 |
| 8,086,457 | B2 | 12/2011 | Campbell et al. | |
| 8,775,535 | B2 | 7/2014 | Hugg et al. | |
| 8,843,365 | B2* | 9/2014 | McGowan | H04L 43/0852 |
| | | | | 704/201 |
| 8,930,182 | B2* | 1/2015 | Ben-David | G10L 21/003 |
| | | | | 704/224 |
| 8,968,103 | B2 | 3/2015 | Zhou et al. | |
| 8,983,841 | B2* | 3/2015 | Pulz | G10L 13/10 |
| | | | | 704/235 |
| 9,043,446 | B1* | 5/2015 | Davis | G06F 1/1626 |
| | | | | 709/224 |
| 9,324,318 | B1* | 4/2016 | Bunn | G10L 21/003 |
| 9,338,399 | B1* | 5/2016 | Franco | G06F 3/165 |
| 9,607,612 | B2* | 3/2017 | Deleeuw | G06V 10/143 |
| 10,031,721 | B2* | 7/2018 | Bucsa | H04R 1/326 |
| 10,878,800 | B2 | 12/2020 | Truong et al. | |
| 11,043,219 | B1* | 6/2021 | Walters | G10L 21/013 |
| 11,052,322 | B1* | 7/2021 | Wu | G06F 3/0481 |
| 11,096,006 | B1* | 8/2021 | Robinson | H04S 7/305 |
| 11,228,682 | B2* | 1/2022 | Vymenets, Jr. | G10L 13/00 |
| 11,430,424 | B2* | 8/2022 | Wolf | G10L 13/08 |
| 11,609,738 | B1* | 3/2023 | Imbruce | G06F 16/64 |
| 2001/0044725 | A1* | 11/2001 | Matsuda | G10L 13/033 |
| | | | | 704/270.1 |
| 2009/0089439 | A1* | 4/2009 | Benco | G06Q 10/10 |
| | | | | 709/228 |
| 2011/0044324 | A1* | 2/2011 | Li | G10L 19/0018 |
| | | | | 370/352 |
| 2011/0246187 | A1* | 10/2011 | Srinivasan | A61B 5/389 |
| | | | | 704/201 |
| 2012/0120218 | A1* | 5/2012 | Flaks | G10L 21/028 |
| | | | | 704/201 |
| 2013/0211826 | A1* | 8/2013 | Mannby | G10L 19/00 |
| | | | | 704/201 |
| 2013/0258040 | A1* | 10/2013 | Kaytaz | H04L 67/131 |
| | | | | 348/E7.078 |
| 2014/0007257 | A1* | 1/2014 | Dougherty | G09B 5/062 |
| | | | | 726/28 |
| 2014/0032211 | A1* | 1/2014 | Kurata | G06F 3/167 |
| | | | | 704/201 |
| 2014/0163982 | A1* | 6/2014 | Daborn | G10L 15/26 |
| | | | | 704/235 |
| 2014/0195222 | A1* | 7/2014 | Peevers | G10L 21/00 |
| | | | | 704/201 |
| 2014/0361974 | A1* | 12/2014 | Li | G06F 3/0304 |
| | | | | 345/156 |
| 2015/0112666 | A1* | 4/2015 | Jerram | G06Q 40/04 |
| | | | | 704/201 |
| 2015/0201054 | A1* | 7/2015 | Gainsboro | H04M 3/2218 |
| | | | | 704/201 |
| 2015/0371215 | A1* | 12/2015 | Zhou | G06F 3/041 |
| | | | | 705/64 |
| 2016/0104474 | A1* | 4/2016 | Bunn | G10L 21/003 |
| | | | | 704/261 |
| 2016/0133268 | A1* | 5/2016 | Yamaguchi | H04S 1/002 |
| | | | | 704/201 |
| 2016/0203827 | A1* | 7/2016 | Leff | G10L 19/125 |
| | | | | 704/207 |
| 2016/0300387 | A1* | 10/2016 | Ziman | G06F 3/165 |
| 2017/0011745 | A1* | 1/2017 | Navaratnam | H04N 7/157 |
| 2017/0123752 | A1* | 5/2017 | Nadler | G06F 3/165 |
| 2017/0256259 | A1* | 9/2017 | Froelich | G10L 15/04 |
| 2018/0336713 | A1* | 11/2018 | Avendano | G06T 13/40 |
| 2019/0026056 | A1* | 1/2019 | Wang | G06F 1/1637 |
| 2019/0278561 | A1* | 9/2019 | Cordell | G06F 3/167 |
| 2020/0034025 | A1* | 1/2020 | Brady | G09B 19/00 |
| 2020/0098163 | A1* | 3/2020 | Freeman | G02B 30/56 |
| 2020/0197810 | A1* | 6/2020 | Kung | H04N 21/42203 |
| 2020/0209957 | A1* | 7/2020 | Sztuk | G06F 3/165 |
| 2020/0225844 | A1* | 7/2020 | Lerner | G06F 3/0482 |
| 2020/0365147 | A1* | 11/2020 | Cordell | G06T 13/205 |
| 2021/0035047 | A1* | 2/2021 | Mossoba | G06T 13/40 |
| 2021/0043188 | A1* | 2/2021 | Candelore | G10L 13/033 |
| 2021/0082452 | A1* | 3/2021 | Woffenden | G06T 13/00 |
| 2021/0279930 | A1* | 9/2021 | Hutten | G06T 11/00 |
| 2021/0390944 | A1* | 12/2021 | Richards | G06N 3/04 |
| 2022/0070295 | A1* | 3/2022 | Shah | G06N 20/00 |
| 2022/0070550 | A1* | 3/2022 | Ingel | H04N 21/44008 |
| 2022/0309755 | A1* | 9/2022 | Hutten | G06F 3/1454 |
| 2022/0309936 | A1* | 9/2022 | Jang | G10L 25/63 |
| 2022/0383263 | A1 | 12/2022 | Mossoba et al. | |
| 2024/0339121 | A1* | 10/2024 | Astinov | G06F 3/167 |

OTHER PUBLICATIONS

Voicemod, "Voice Avatars: The Sound of a New You," Apr. 5, 2023, 3 pages, Retrieved from the Internet: URL: https://www.voicemod.net/voice-avatars/.

Wu X., et al., "Voichap: A Standalone Real-Time Voice Change Application on iOS Platform," Asia-Pacific Signal and Information Processing Association Annual Summit and Conference (APSIPA ASC), Dec. 12-15, 2017, 5 pages.

Anonymous: "Use Device Profiles for Generated Audio," The Wayback Machine, Mar. 26, 2023, [retrieved on Jun. 26, 2024], 2 pages, Retrieved from the Internet URL: https://web.archive.org/web/20230326163721/https://cloud.google.com/text-to-speech/docs/audioprofiles.

European Search Report for European Patent Application No. 24160011.3, dated Jun. 27, 2024, 8 pages.

Sharkov B., "Clownfish Voice Changer," The Wayback Machine, Apr. 1, 2023, [retrieved on Jun. 26, 2024], 6 pages, Retrieved from the Internet URL: https://web.archive.org/web/20230401000716/https://clownfish-translator.com/voicechanger/.

* cited by examiner

VOICE AVATARS IN EXTENDED REALITY ENVIRONMENTS

TECHNICAL FIELD

This disclosure generally relates to databases and file management within network environments, and in particular relates to audio processing in an extended reality (XR) setting.

BACKGROUND

Extended reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In XR applications (e.g., multiplayer games, and social network applications), a user may customize many aspects of the user's avatar, such as facial features, hair, skin, clothing, and accessories. The user may decide the appearance of the user's avatar and make the appearance universal across different applications as part of the user's metaverse identity. Audio is essential in XR product experiences as a potent cue for people to identify objects and events. Improving the audio quality of shared videos from creators may increase user delight in watching the shared videos. An improvement in audio quality, combined with an increasing count of views and viewers, may motivate creators to create more content associated with the creators' personalization. However, users may not decide how the users want to sound in the metaverse and carry that sound to other XR applications. In such a case, audio is not utilizing its full potential in the existing XR environment as a powerful medium for personal expression.

SUMMARY OF PARTICULAR EMBODIMENTS

In particular embodiments, one or more computing systems may access a voice avatar as a digital asset that a user may obtain from an online marketplace in an extended reality (XR) environment. The voice avatar may allow the user to customize voice as part of the user's online identity across XR platforms. The online marketplace may create opportunities for users to provide and obtain voice avatars. Audio processing that corresponds to the voice avatars may be used as a unique part of the user's online presence, identity, personal expression, and as a metaverse commodity. These voice avatars can become a rich medium for personal expression and become a part of the user's online persona in the metaverse and across all XR experiences in the same way as the user's profile photo, application image filters, and XR avatars. The voice avatar may be an audio profile. The voice avatar may be a text-based description comprising instructions describing how to transform a digital audio stream. For example, the instructions may comprise texts describing how to transform an audio input of the user captured by a microphone. one or more computing systems (e.g., an audio framework) may understand the texts and render the audio input with special effects as described by the texts. The description may describe an audio processing chain, and the computing system may construct the audio processing chain and render the user's voice as described by the voice avatar using the constructed audio processing chain. The voice avatar may be portable over the network as a digital asset that describes how audio is transformed. The voice avatar may describe different levels of complexity about how audio is transformed. The user may obtain any existing voice avatar in the online marketplace. Furthermore, the user may generate new voice avatars for personal use and provide the new voice avatars to other users (for example, by uploading the new profiles to the online marketplace). The user may possess a plurality of voice avatars associated with a plurality of user identities.

In particular embodiments, one or more computing systems may access a first voice avatar associated with a first user. The first voice avatar may comprise a first description of a first audio processing chain to transform voice inputs. The one or more computing systems may receive a first voice input from a first client system of the first user. The one or more computing systems may process the first voice input to generate a first transformed audio corresponding to the first voice input. One or more audio processors may process the first voice input. The one or more audio processors may be constructed based on the description of the first audio processing chain from the first voice avatar. The one or more computing systems may send the first transformed audio to one or more second client systems of one or more second users for playback.

In particular embodiments, the one or more computing systems may access a second voice avatar associated with a second identity of the first user in response to an indication of an identity change. A change of platforms may cause an identity change (e.g., the user switches from one application to another). In particular embodiments, the user may have one user identity universally for different platforms. The one or more computing systems may keep using the first voice avatar to transform voice inputs when receiving an indication of a platform change.

In particular embodiments, the user may customize the voice avatar through a user interface provided on the client system. The user may interact with the user interface to customize one or more attributes of the voice avatar by modifying the one or more audio processors. The one or more computing systems may generate a customized voice avatar according to the modified one or more audio processors of the voice avatar. The one or more computing systems may store the customized voice avatar locally. The one or more computing systems may send the customized voice avatar to the online marketplace to make it available to other users.

Certain technical challenges exist for leveraging sound and audio effects as parts of users' online identity across XR platforms. One technical challenge may include generating a digital asset that a user may use to customize voice as part of the user's online identity. The solution presented by the embodiments disclosed herein to address this challenge may be creating a voice avatar as a digital asset that users can obtain from an online marketplace, allowing users to customize how they sound from the voice avatar. Another technical challenge may include universally transforming the user's voice input at run-time across XR platforms. The solution presented by the embodiments disclosed herein to address this challenge may be dynamically constructing audio processors according to a description of an audio processing chain of the voice avatar.

Certain embodiments disclosed herein may provide one or more technical advantages. A technical advantage of the embodiments may include enabling users to customize their voices associated with the users' identities according to voice avatars. The voice avatars may be universal and portable across different platforms. Another technical advantage of the embodiments may include improving productivity and efficiency in generating diverse voice avatars for the users in an XR environment. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
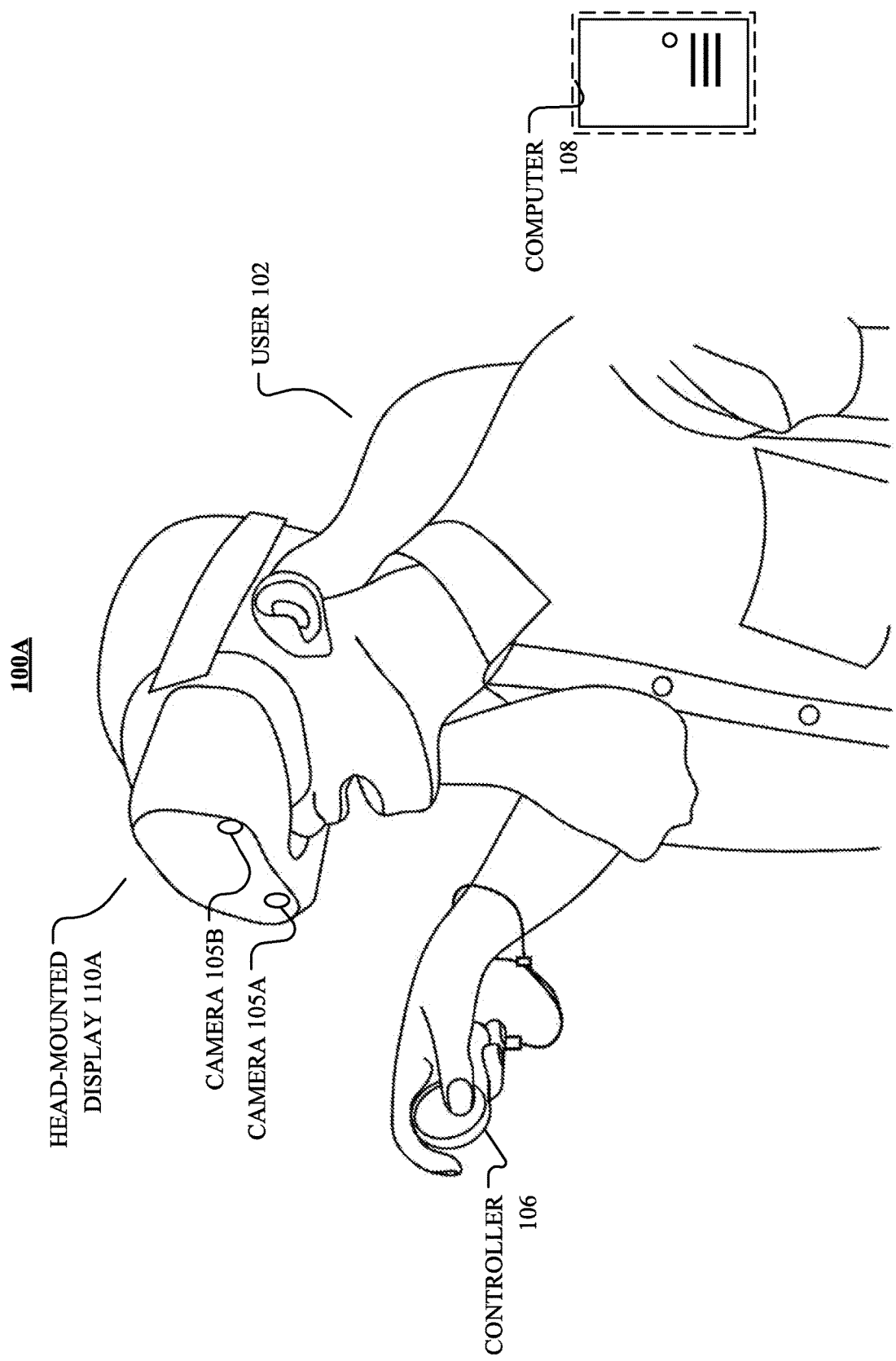
FIG. 1A illustrates an example virtual reality system worn by a user.

FIG. 1A illustrates an example of a virtual reality system 100A worn by a user 102. In particular embodiments, the virtual reality system 100 may comprise a head-mounted VR display device 110A, a controller 106, and one or more computing systems 108. The VR display device 110A may be worn over the user's eyes and provide visual content to the user 102 through internal displays (not shown). The VR display device 110A may have two separate internal displays, one for each eye of the user 102 (single display devices are also possible). In particular embodiments, the VR display device 110A may comprise one or more external-facing cameras, such as the two forward-facing cameras 105A and 105B, which can capture images and videos of the real-world environment. As illustrated in FIG. 1A, the VR display device 110A may completely cover the user's field of view. By being the exclusive provider of visual information to the user 102, the VR display device 110A achieves the goal of providing an immersive artificial-reality experience. One consequence of this, however, is that the user 102 may not be able to see the physical (real-world) environment surrounding the user 102, as their vision is shielded by the VR display device 110A. As such, the passthrough feature described herein may be technically advantageous for providing the user with real-time visual information about their physical surroundings.

Figure 1B:
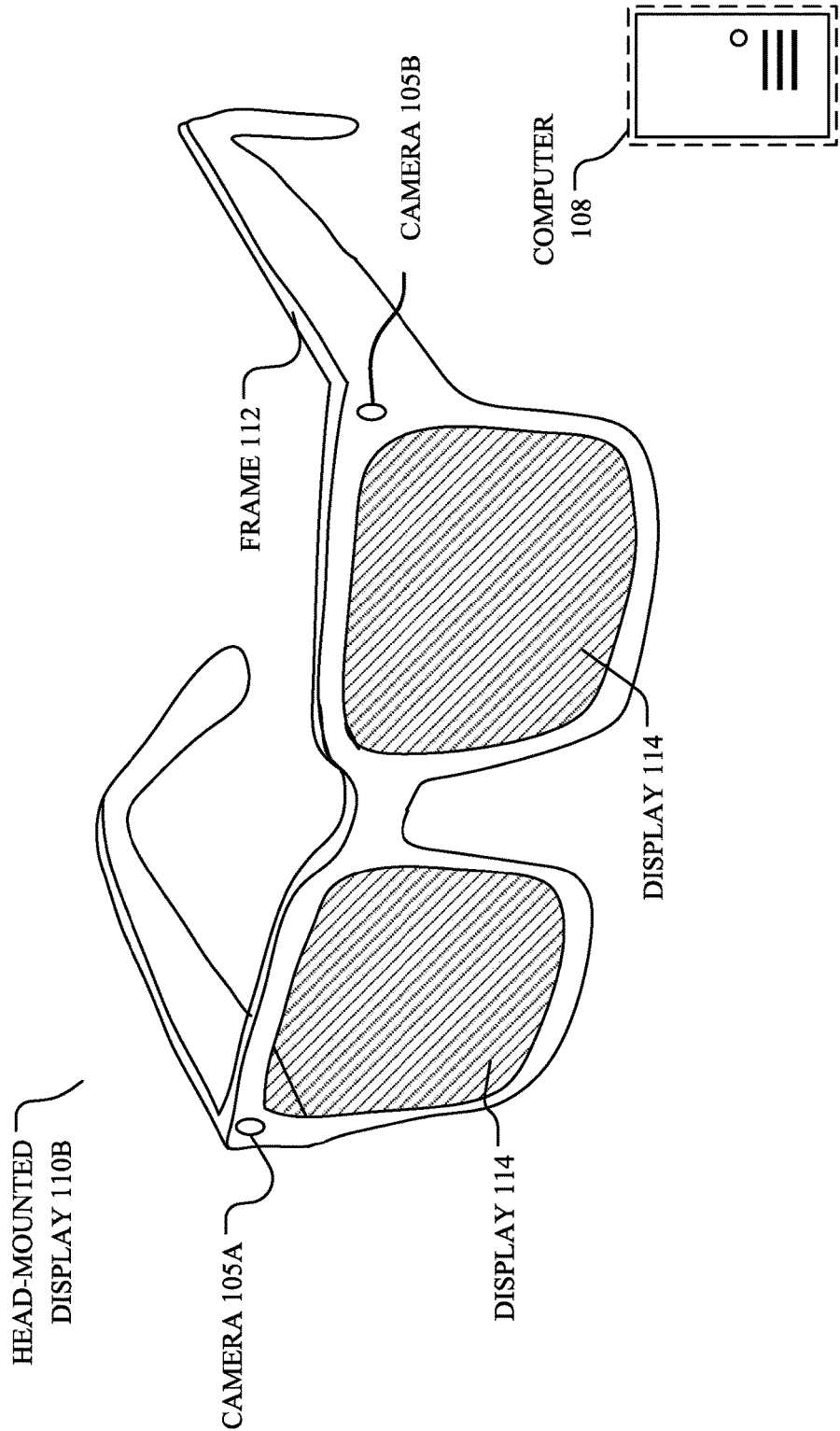
FIG. 1B illustrates an example augmented reality system.

FIG. 1B illustrates an example augmented reality (AR) system 100B. The augmented reality system 100B may include a head-mounted display AR display device 110B comprising a frame 112, one or more displays 114, and one or more computing systems 108. The AR display device 110B may be worn over the user's eyes (e.g., like eyeglasses) and provide visual content to a user 102 (not shown) through displays 114. The one or more displays 114 may be transparent or translucent allowing a user wearing the AR display device 110B to look through the displays 114 to see the real-world environment and displaying visual artificial reality content to the user at the same time. The AR display device 110B may include an audio device that may provide audio artificial reality content to users. The AR display device 110B may include one or more external-facing cameras, such as the two forward-facing cameras 105A and 105B, which can capture images and videos of the real-world environment. The AR display device 110B may include an eye tracking system to track the vergence movement of the user wearing the AR display device 110B. The augmented reality system 100B may further include a controller 106 (not shown) comprising a trackpad and one or more buttons. The controller 106 may receive inputs from users and relay the inputs to the computing system 108. The controller 106 may also provide haptic feedback to users. The computing system 108 may be connected to the AR display device 110B and the controller through cables or wireless connections. The computing system 108 may control the AR display device 110B and the controller to provide the augmented reality content to and receive inputs from users. The computing system 108 may be a standalone host computer system, an on-board computer system integrated with the AR display device 110B, a mobile computing device, or any other hardware platform capable of providing artificial reality content to and receiving inputs from users.

In particular embodiments, one or more computing systems 108 may access a voice avatar as a digital asset that a user 102 may obtain from an online marketplace in an extended reality (XR) environment. The voice avatar may allow the user 102 to customize voice as part of the user's online identity across XR platforms. The online marketplace may create opportunities for the user 102 to provide and obtain voice avatars. The voice avatar may be a text-based description comprising instructions describing how to transform a digital audio stream. As an example and not by way of limitation, the instructions may comprise texts describing how to transform an audio input of the user 102 captured by a microphone. The one or more computing systems 108 (e.g., an AR/VR engine) may understand the texts and render the audio input with special effects described by the texts. The description may describe an audio processing chain, and the computing system may construct the audio processing chain and render the user's voice as described by the voice avatar using the constructed audio processing chain. The voice avatar may be portable over the network as a digital asset that describes how audio is transformed. Although this disclosure describes transforming voice input based on a voice avatar in a particular manner, this disclosure contemplates transforming voice input based on a voice avatar in any suitable manner.

In particular embodiments, the user 102 may provide an audio input through a microphone of a client device (e.g., mobile phone, HMD 110A and 110B) while using an application (e.g., a multiplayer game, an online meeting application, a user-generated content sharing application) that runs on the client device. The user 102 may select a voice avatar. As an example not by way of limitation, the voice avatar may be selected from an online marketplace. Additionally or alternatively, the voice avatar may be selected from a plurality of voice avatars that are locally stored. An audio framework (e.g., AR/VR engine) may access the voice avatar and transform the user's voice to a customized sound as desired by the user 102 based on the voice avatar. As an example not by way of limitation, the customized sound may relate to a movie character, a chipmunk, or a special effect with birds chirping all around in a three-dimensional space. The audio framework may determine an audio pipeline dynamically according to the voice avatar. The voice avatar may describe a plurality of audio processors needed in the audio pipeline via text according to the user's customized audio effect. The audio framework may receive the description of the voice avatar and then analyze the description of the voice avatar to determine one or more processors for the audio pipeline to perform audio processing. The audio framework may then transform the user's audio input as instructed by the description of the voice avatar. Once the audio framework has finished the transformation of the user's audio input, the audio framework may transmit the transformed audio to other users or make the transformed audio available within the application that the user is using through a network. Additionally or alternatively, the user's audio may be transmitted in its original form (i.e., not transformed), and the description of the voice avatar may be received and analyzed by the audio framework at a receiving end of any of the other users that receive the user's audio or view the user's post. Although this disclosure describes generating an audio processing pipeline based on a voice avatar in a particular manner, this disclosure contemplates generating the audio processing pipeline based on a voice avatar in any suitable manner.

In particular embodiments, the voice avatar may describe different levels of complexity about how audio is transformed. As an example not by way of limitation, the voice avatar may be described as simple as making the voice audible and compressed without noise. As an example not by way of limitation, the voice avatar may have a complex description such as transforming the voice to sound like a chipmunk in a cave with bats flying around in a three-dimensional space. The voice avatar may be stored on the server and may be obtained upon request when needed. Although this disclosure describes the voice avatar in a particular manner, this disclosure contemplates the voice avatar in any suitable manner.

In particular embodiments, the user 102 may transfer and share the voice avatar as part of the user's online identity between any XR applications or devices. As an example not by way of limitation, the user 102 may use the audio profile to send a voice message or generate content in social network applications. The voice avatar may be portable and universal so that XR devices and applications across different platforms may understand the description of the voice avatar. The transformed voice based on the audio profile may be rendered across different operating and XR systems. The user 102 may possess a plurality of audio profiles associated with a plurality of identities. As an example not by way of limitation, the user may have multiple XR identities in the metaverse, and the user may have a different audio profile for each XR identity. As an example not by way of limitation, the user may have multiple audio profiles for one XR identity to express different emotions. The user may switch between identities in the metaverse by changing their VR avatars. Additionally or alternatively, the voice avatar associated with the user's identity may be switched based on the switching between VR avatars (i.e., changing the user's VR avatar also causes their voice avatar to change). Additionally or alternatively, the AR/VR engine used to process the audio framework may reside on the client device, which may protect the user's privacy because the user's original voice is collected and transformed at the client device instead of being sent to a server for processing. Although this disclosure describes associating the voice avatars with user identities in a particular manner, this disclosure contemplates associating the voice avatars with user identities in any suitable manner.

In particular embodiments, the user 102 may obtain any existing voice avatars in the online marketplace. Additionally or alternatively, the user 102 may generate new voice avatars for personal use and provide the new audio profiles to other users (for example, by uploading the new profiles to the online marketplace). The user 102 may describe a new voice avatar in a way that a cross-platform audio framework may understand. As an example not by way of limitation, the user may use a uniform declarative audio format to generate the new audio profile. The user 102 may package the new voice avatar into a digital asset and offer the new audio profile to other users in the metaverse. The user may be provided with tools (e.g., a user interface rendered on the client device) that allow the user to provide descriptions of the new voice avatars or interact with the existing voice avatars. Although this disclosure describes customizing voice avatars in a particular manner, this disclosure contemplates customizing voice avatars in any suitable manner.

Figure 2:
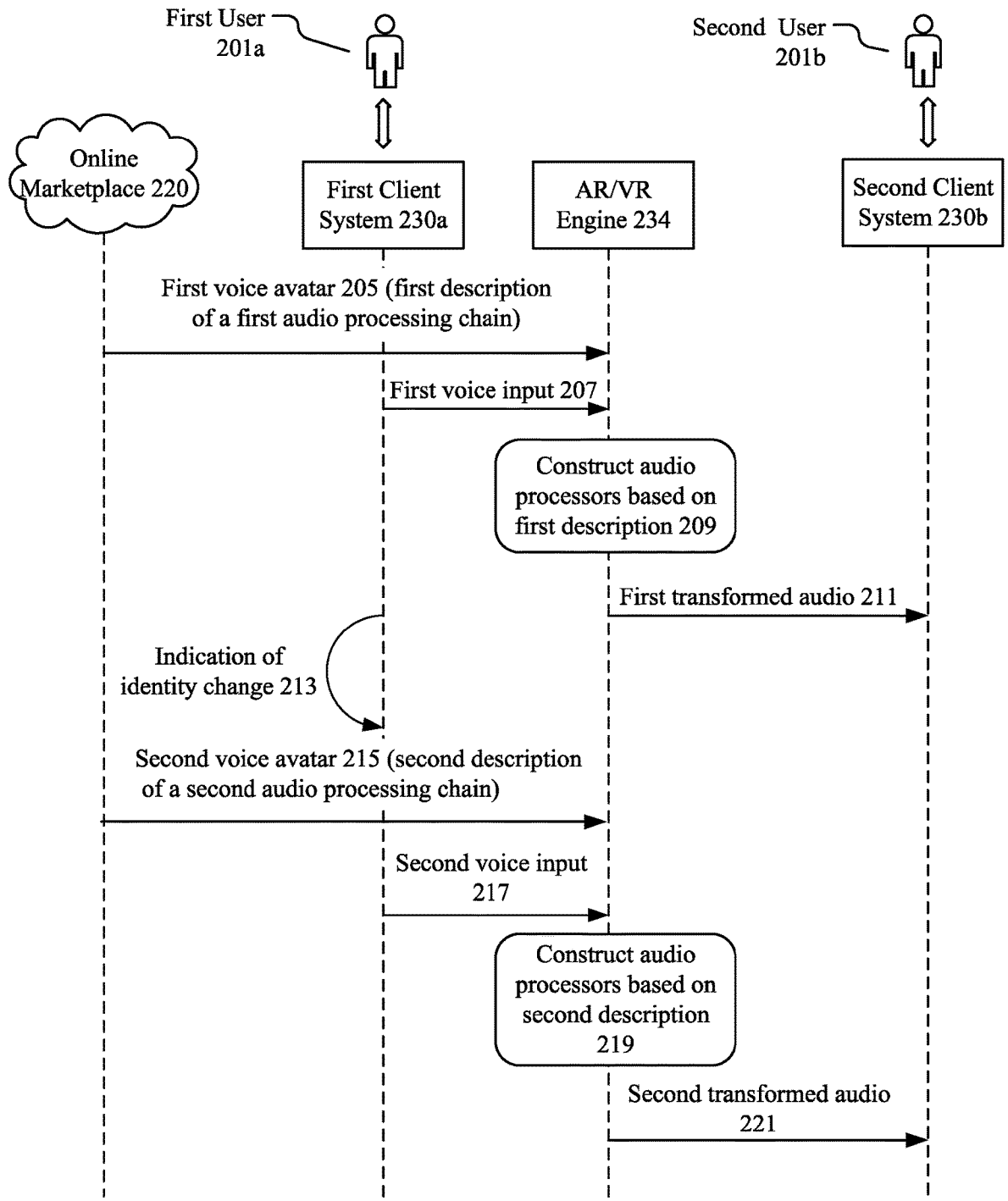
FIG. 2 illustrates an example sequence diagram of a process for transforming the user's voice based on voice avatars associated with the user identities.

FIG. 2 illustrates an example sequence diagram 200 of a process for transforming the user's voice based on voice avatars associated with the user identities. The one or more computing systems 108 may access a first voice avatar 205 associated with a first user 201a. The first voice avatar may comprise a first description of a first audio processing chain to transform voice inputs. The first user 201a may obtain the first voice avatar 205 from an online marketplace 220. Additionally or alternatively, the first user 201a may obtain the first voice avatar 205 by logging in to a remote user account associated with the first user 201a. The first voice avatar 205 may be stored locally at a user device associated with the first user 201a. In particular embodiments, the first voice avatar 205 may be a text-based file. As an example not by way of limitation, the first voice avatar 205 may be a declarative audio text file in text (e.g., JSON, XML). The text file may comprise a text-based encoding system consisting of descriptions that may be understood and processed by an audio framework (e.g., AR/VR engine 234). As an example not by way of limitation, the first voice avatar 205 of the first user 201a may allow the user to sound like a chipmunk and the first description of the first audio processing chain may comprise text description of audio processors and parameters associated with each of the audio processors to transform the first voice input 207 to a chipmunk sound.

In particular embodiments, the one or more computing systems 108 may receive a first voice input 207 from a first client system 230a of the first user 201a. As an example not my way of limitation, the first user 201a may provide first voice input 207 through a microphone of a client device (e.g., mobile phone, HMD) while using an application (e.g., a multiplayer game, an online meeting application, a user-generated content sharing application) running on the client device of the first client system 230a. In particular embodiments, the first voice avatar 205 and the first voice input 207 associated with the first user 201a may be received and processed by an AR/VR engine 234 as described below. The AR/VR engine 234 may comprise an audio framework used in the XR environment for image and audio processing and rendering. The AR/VR engine 234 may reside on the first client system 230a associated with the first user 201a.

In particular embodiments, the one or more computing systems 108 may use the AR/VR engine 234 to perform operation 209. At operation 209, the one or more computing systems 108 may adopt the AR/VR engine 234 to construct one or more audio processors based on the first description of the first audio processing chain that corresponds to the first voice avatar 205. The one or more computing systems 108 may process the first voice input 207 to generate a first transformed audio 211 corresponding to the first voice input 207. The first voice input 207 may be processed by the one or more audio processors. As an example not by way of limitation, an audio framework of the AR/VR engine 234 may access and understand the first description (e.g., JSON file) of the first voice avatar 205 and may dynamically construct one or more audio processors according to the first description (e.g., JSON file) to transform the first voice input 207 at run-time. The first voice avatar 205 may be received and analyzed at run-time without being compiled in advance. In particular embodiments, the first voice avatar 205 may be optimized for the XR platforms on which the first voice avatar 205 is running. In particular embodiments, the first voice avatar 205 may be downloaded in a binary form. The binary form may be specific to a particular XR platform. In particular embodiments, the binary format of the first voice avatar 205 may be generated on demand as needed. The first voice avatar 205 may be easily downloaded and used by the XR platforms and applications such that the XR platforms or applications may not need to store the binary format of the first voice avatar 205 permanently, which may save storage space. The first description of the first audio processing chain corresponds to the first voice avatar may describe a plurality of audio transformations performed by a plurality of audio processors. As an example not by way of limitation, the plurality of audio transformations may comprise one or more of changing an audio speed, changing an audio pitch, changing a tempo, changing prosody, reducing noises, changing reverb, changing echo, or changing equalization effects. The plurality of audio processors may comprise one or more of an audio speed processor, an audio pitch processor, an audio tempo processor, an audio prosody processor, an audio noise processor, an audio reverb processor, an audio echo processor, or an audio equalization effects processor. The audio framework of the AR/VR engine 234 may receive and analyze the first voice avatar 205 and cause audio transformation as described in the first voice avatar 205, which may allow developers to use declarative programming to produce custom audio transformations. The AR/VR engine 234 may comprise a system-level audio framework capable of accessing and processing various voice avatars on various client systems. Additionally or alternatively, the AR/VR engine 234 may comprise a cross-platform audio framework that is operable to run on a plurality of applications across a plurality of operating systems.

In particular embodiments, the one or more computing systems 108 may send the first transformed audio 211 to one or more second client systems 230b of one or more second users 201b for playback. Additionally or alternatively, the AR/VR engine 234 may reside on the second client system 230b. The first user 201a may provide the first voice input 207 to the first client system 230a and the first client system 230a may send the first voice input 207 to the second client system 230b associated with the second user 201b. The second client system 230b may access the first voice avatar 205 and transform the first voice input 207 using the AR/VR engine 234 on the second client system 230b. As an example not by way of limitation, the second client system 230b may recognize an online identity of the first user 201a associated with the first voice input 207. The one or more computing systems 108 may then access the first voice avatar 205 from a remote database server that stores information of user profiles/accounts and voice avatars.

In particular embodiments, the first voice avatar 205 is associated with a first user identity of the first user 201a. The first user 201a may switch user identities while in the XR environment. As an example not by way of limitation, the first user 201a may switch between an XR game and a social media platform and the XR game may be associated with a first user identity while the social media platform may be associated with a second user identity. Additionally or alternatively, the first user 201a may change the user identity within the same application. As an example not by way of limitation, the first user 201a may have two user identities on the social media platform so that each user identity may correspond to different channels that focus on different categories of user-generated content. The first user 201a may create videos related to high technology for a first channel associated with the first user identity; and may create videos related to beach vacation guidance for a second channel associated with the second user identity on the same social media platform. The first user 201a may sound like a robot on the high-tech channel and may have a three-dimensional sound with a breeze, seagulls, and sea waves surrounded in the XR environment at the beach vacation guidance channel. In particular embodiments, the one or more computing systems 108 may access the first voice avatar 205 associated with the first user identity. The one or more computing systems 108 may then receive an indication of an identity change 213 from the first user identity of the first user to a second user identity of the first user 201a. The one or more computing systems 108 may access, responsive to the received indication, a second voice avatar 215 associated with the second user identity of the first user 201a. The second voice avatar 215 may comprise a second description of a second audio processing chain to transform the voice inputs. As an example not by way of limitation, the first voice avatar 205 may correspond to the first description of the first audio processing chain consisting of a first series of audio processors that may transform the first voice input 207 into a robot sound; and the second voice avatar 215 may correspond to the second description of the second audio processing chain consisting of a second series of audio processors that may transform the first voice input 207 into the three-dimensional beach vide sound with breeze, seagulls, and sea waves.

In particular embodiments, the one or more computing systems 108 may receive a second voice input 217 from the first client system 230a of the first user 201a. The second voice avatar 215 and the second voice input 217 associated with the first user 201a may be received and processed by an AR/VR engine 234. In particular embodiments, the one or more computing systems 108 may use the AR/VR engine 234 to perform operation 219. At operation 219, the one ore more computing systems 108 may adopt the AR/VR engine 234 to construct one or more second audio processors based on the second description of the second audio processing chain that corresponds to the second voice avatar 215. The one or more computing systems 108 may process the second voice input 217 to generate a second transformed audio 221 corresponding to the second voice input 217. The second voice input 217 may be processed by the one or more second audio processors.

In particular embodiments, the one or more computing systems 108 may receive an indication of a platform change from a first user platform to a second user platform. The first user platform may be associated with the first user identity of the first user 201a, and the second user platform may be associated with a second user identity of the first user 201a. The one or more computing systems 108 may access, responsive to the received indication of platform change, the second voice avatar associated with the second user identity of the first user 201a. In particular embodiments, the platform change may comprise one or more of an application change, a hardware device change, or an operating system change. In particular embodiments, the first user 201a may be associated with a plurality of user identities, and the plurality of user identities may be associated with a plurality of voice avatars.

In particular embodiments, the first user 201a may be associated with a plurality of extended reality (XR) avatars in an XR environment, and the plurality of XR avatars may be associated with a plurality of voice avatars. The plurality of voice avatars may be portable and universal across the network. XR devices and applications across different platforms may understand the description of the plurality of voice avatars and may render the transformed voice based on the voice avatars across different operating systems and different XR systems. As an example and not by way of limitation, the first user 201a may apply a squirrel-theme XR avatar gear (e.g., squirrel ears and tails). The squirrel-theme XR avatar may be associated with a squirrel voice avatar. The first user 201a's voice may be transformed based on the squirrel voice avatar to match the squirrel appearance in the metaverse. In particular embodiments, the one or more computing systems 108 may access different voice avatars according to different XR avatars. The one or more computing systems 108 may receive an indication of an XR avatar change from a first XR avatar to a second XR avatar of the plurality of XR avatars in the XR environment. The first XR avatar is associated with the first voice avatar, and wherein the second XR avatar is associated with a second voice avatar. The one or more computing systems 108 may then access, responsive to the received indication, the second voice avatar associated with the second XR avatar of the first user. In particular embodiments, the first user 201a may switch identities in the XR environment across platforms universally by switching voice avatars. The one or more computing systems 108 may receive an indication of a voice avatar change from a first voice avatar to a second voice avatar. The first voice avatar is associated with a first XR avatar, and wherein the second voice avatar is associated with a second XR avatar. The one or more computing systems 108 may render responsive to the received indication, the second XR avatar for one or more displays associated with the one or more computing systems 108. In particular embodiments, the one or more computing systems 108 are associated with a plurality of platforms, and wherein the plurality of platforms are associated with a plurality of voice avatars. The plurality of platforms may comprise a plurality of application platforms, a plurality of hardware device platforms, and a plurality of operating system platforms.

In particular embodiments, the first user 201a may transfer and share the first voice avatar and other voice avatars that are associated with plurality of user identities between XR applications or devices. As an example not by way of limitation, the first user 201a may use the first voice avatar 205 to send a voice message or generate content in social network applications.

In particular embodiments, the first voice avatar 205 may correspond to an anonymous mode in the XR environment. The description of the first audio processing chain may comprise instructions for the one or more audio processors to transform the first voice input in the anonymous mode by one or more of altering an audio speed, altering an audio pitch, altering an audio tempo, altering an audio prosody, altering an equalization, reducing a noise, adding a reverb, adding a resonance, adding an echo, or adding a three-dimensional effect. The user may activate the anonymous mode by providing a user input while in an XR application. The user input for activating the anonymous mode may comprise toggling a button (e.g., microphone bar) while in the XR environment. The audio framework of the AR/VR engine 234 may receive, process, and render voice inputs at a system level to leverage the portability of the audio profile since the audio may be filtered at the system level before being received by a particular application.

Figure 3:
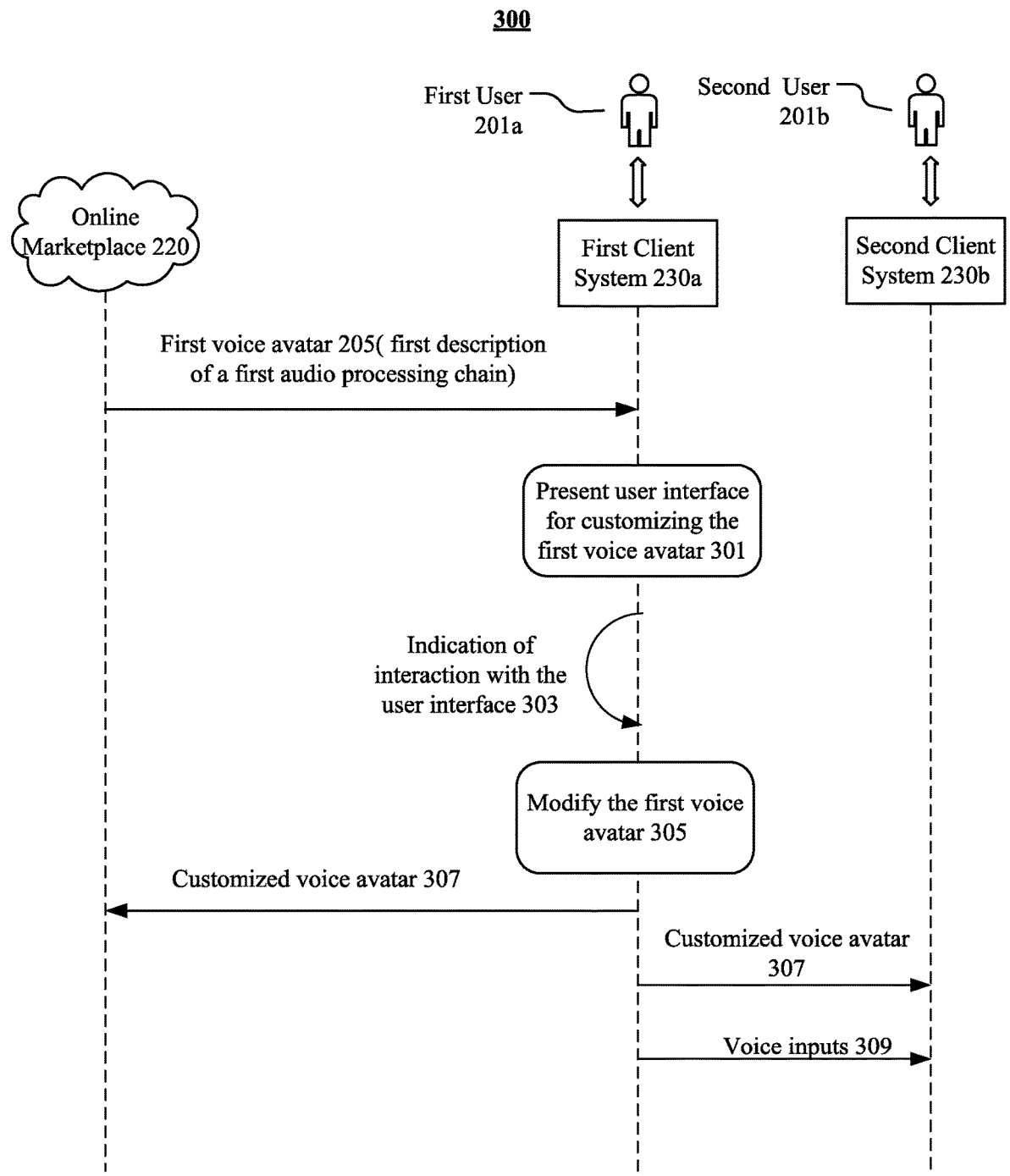
FIG. 3 illustrates an example sequence diagram of a process for customizing voice avatars.

FIG. 3 illustrates an example sequence diagram 300 of a process for customizing voice avatars. The first client system 230a associated with the first user 201a may access a first voice avatar 205 that may comprise the first description of the first audio processing chain to transform voice inputs. The one or more computing systems 108 may send instructions for presenting a user interface on the first client system 230a. At operation 301, the first client system 230a may use the AR/VR engine residing on the first client system 230a to render the user interface. The user interface may comprise a plurality of interactable elements for customizing a plurality of attributes of the first voice avatar 205. The plurality of attributes may be altered by the one or more audio processors. As an example not by way of limitation, the plurality of attributes may comprise one or more of an audio speed, an audio pitch, an audio tempo, an audio prosody, a noise reduction, a reverb, a resonance, an echo, an equalization, or a three-dimensional effect. The one or more computing systems 108 may receive an indication of 303 of the first user 201*a* interacting with one or more of the plurality of interactable elements to customize one or more attributes. The one or more computing systems 108 may modify one or more of the audio processors of the first voice avatar according to the received indication 303 at operation 305. A customized voice avatar 307, according to the modified one or more audio processors of the first voice avatar 205 may be generated at the client system 230*a*. The customized voice avatar 307 may be stored locally at the first client system 230*a*. Additionally or alternatively, the customized voice avatar 307 and voice inputs 309 associated with the first user 201*a* may be sent to the second client system 230*b* for further processing. The second user 201*b* may receive the transformed voice of the first user 201*a* based on the customized voice avatar 307. The transformed voice may be generated locally by an AR/VR engine that resides on the second client system 230*b*. Additionally or alternatively, the customized voice avatar 307 may be sent back to the online marketplace 220.

In particular embodiments, XR users (e.g., first user 201*a*, second user 201*b*) may obtain the first voice avatar 205 from existing voice avatars in the online marketplace 220. The first user 201*a* may generate customized voice avatars for personal use and may provide the customized voice avatars to other users by uploading the customized voice avatars to the online marketplace 220 or sending the customized voice avatars directly to the second user 201*b*. The first user 201*a* may describe customized voice avatars that a cross-platform audio framework may understand. As an example not by way of limitation, the first user 201*a* may use a uniform declarative format (e.g., JSON) to generate the customized voice avatars. The customized voice avatars may be based on existing voice avatars, so the first user 201*a* may interact with the existing voice avatars to create the customized voice avatars. As an example not by way of limitation, the first user 201*a* may modify one or more parameters associated with the audio processors constructed based on the descriptions of the existing voice avatars. As an example not by way of limitation, the first user 201*a* may add or remove audio processors constructed based on the descriptions of the existing voice avatars. As an example not by way of limitation, the first user 201*a* may insert a link referring to one or more sound effects to the description of the existing voice avatars to re-generate the existing voice avatars. Additionally or alternatively, the customized voice avatars may be entirely customized by the user. As an example, not by limitation, the user may describe every aspect of how the user wants to sound by providing instructions for adjusting one or more parameters associated with a plurality of sound attributes (e.g., pitch, tempo, and echo). The first user 201*a* may package the new audio profile into a digital format file (e.g., JSON file) and offer the customized voice avatars to other users in the metaverse.

Figure 4:
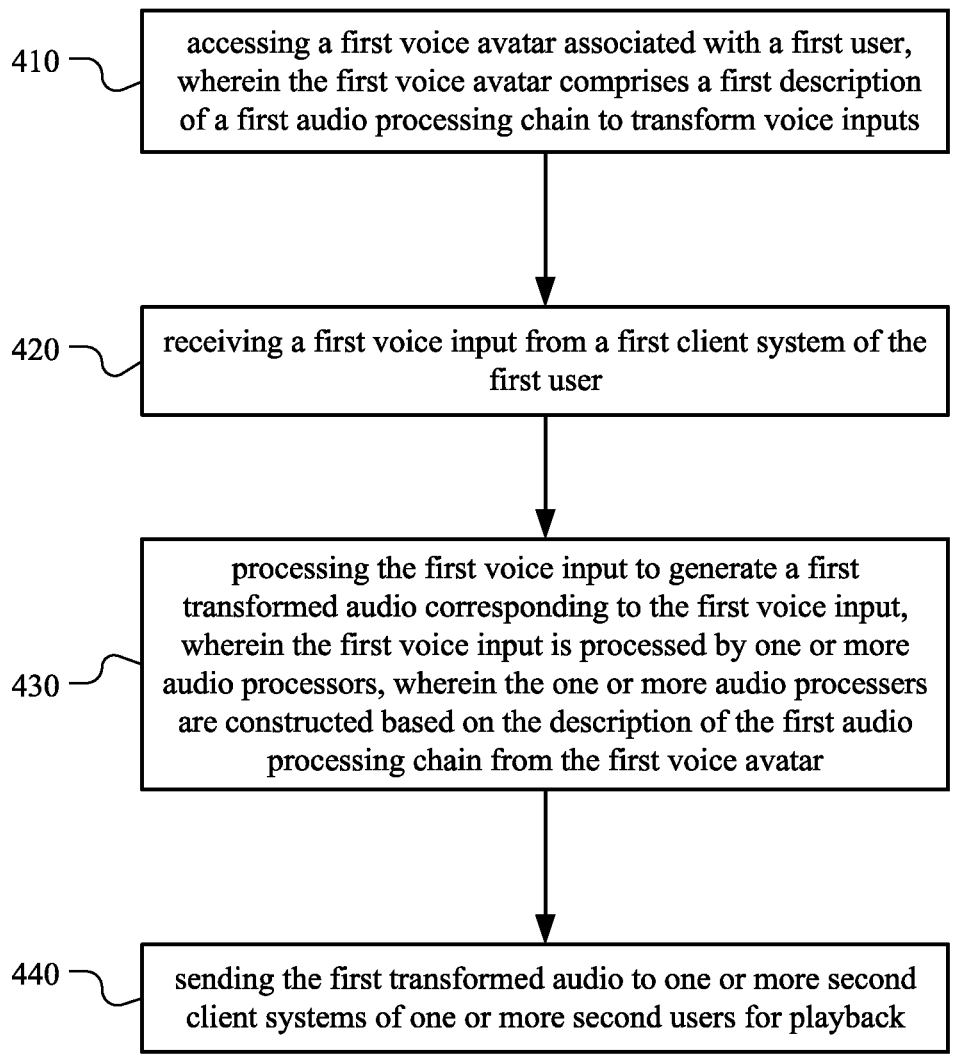
FIG. 4 illustrates an example method for transforming the user's voice based on a description of an audio processing chain of the voice avatar associated with the user.

FIG. 4 illustrates an example method 400 for transforming the user's voice based on a description of an audio processing chain of the voice avatar associated with the user. The method may begin at step 410, where the one or more computing systems 108 may access a first voice avatar associated with a first user. The first voice avatar may comprise a first description of a first audio processing chain to transform voice inputs. At step 420, the one or more computing systems 108 may receive a first voice input from a first client system of the first user. At step 430, the one or more computing systems 108 may process the first voice input to generate a first transformed audio corresponding to the first voice input. The first voice input may be processed by one or more audio processors. The one or more audio processors may be constructed based on the description of the first audio processing chain from the first voice avatar. At step 440, the one or more computing systems 108 may send the first transformed audio to one or more second client systems of one or more second users for playback. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for transforming the user's voice based on a description of an audio processing chain of the voice avatar associated with the user including the particular steps of the method of FIG. 4, this disclosure contemplates any suitable method for transforming the user's voice based on a description of an audio processing chain of the voice avatar associated with the user including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
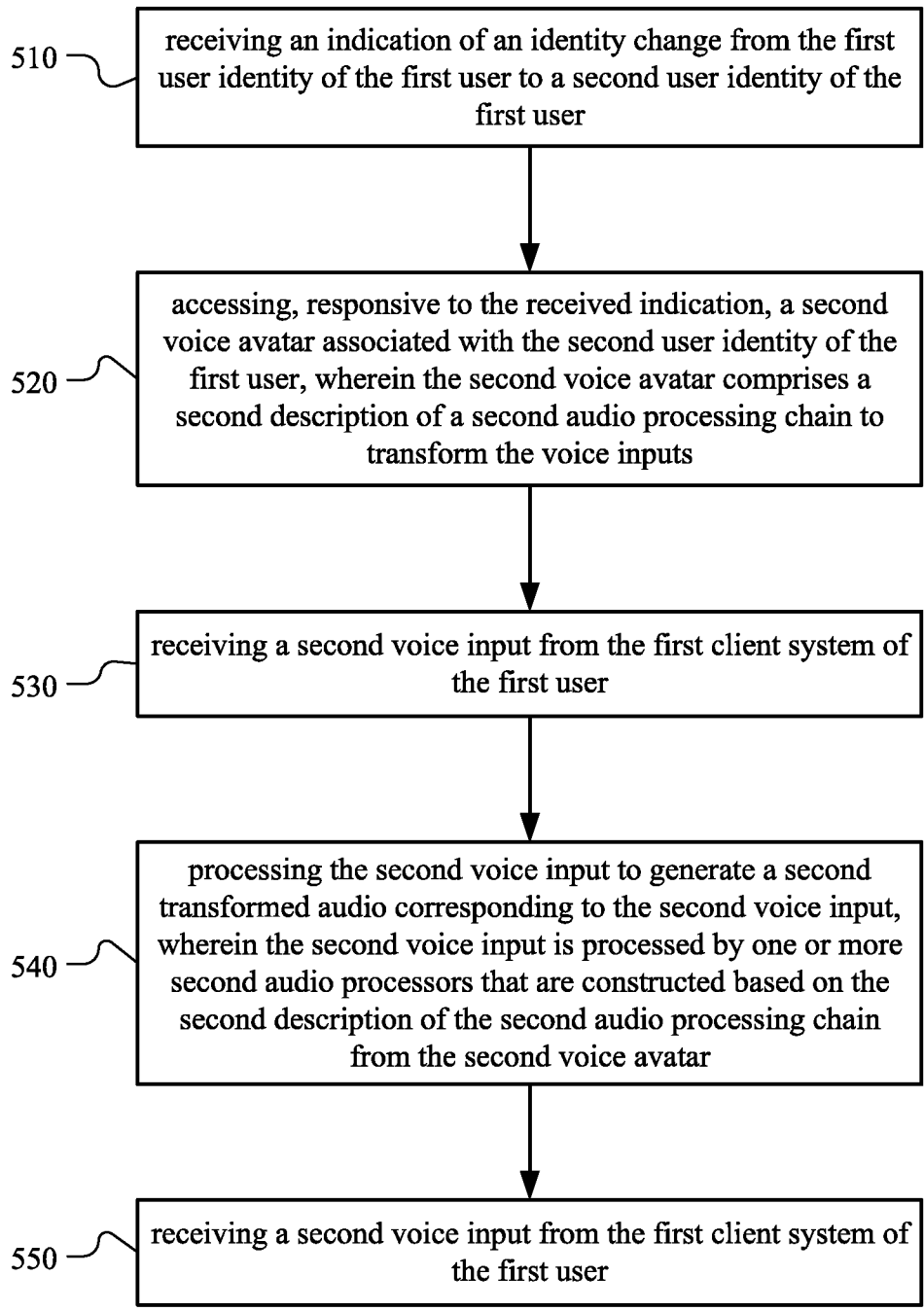
FIG. 5 illustrates an example method for switching voice avatars for the user in response to the identification changes.

FIG. 5 illustrates an example method 500 for switching voice avatars for the user in response to the identification changes. The method may begin at step 510, where one or more computing systems 108 may receive an indication of an identity change from the first user identity of the first user to a second user identity of the first user. At step 520, one or more computing systems 108 may access, responsive to the received indication, a second voice avatar associated with the second user identity of the first user. The second voice avatar may comprise a second description of a second audio processing chain to transform the voice inputs. At step 530, one or more computing systems 108 may receive a second voice input from the first client system of the first user. At step 540, one or more computing systems 108 may process the second voice input to generate a second transformed audio corresponding to the second voice input. The second voice input may be processed by one or more second audio processors constructed based on the second description of the second audio processing chain from the second voice avatar. At step 550, one or more computing systems 108 may receive a second voice input from the first client system of the first user. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for switching voice avatars for the user in response to the identification changes including the particular steps of the method of FIG. 5, this disclosure contemplates any suitable method for switching voice avatars for the user in response to the identification changes including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
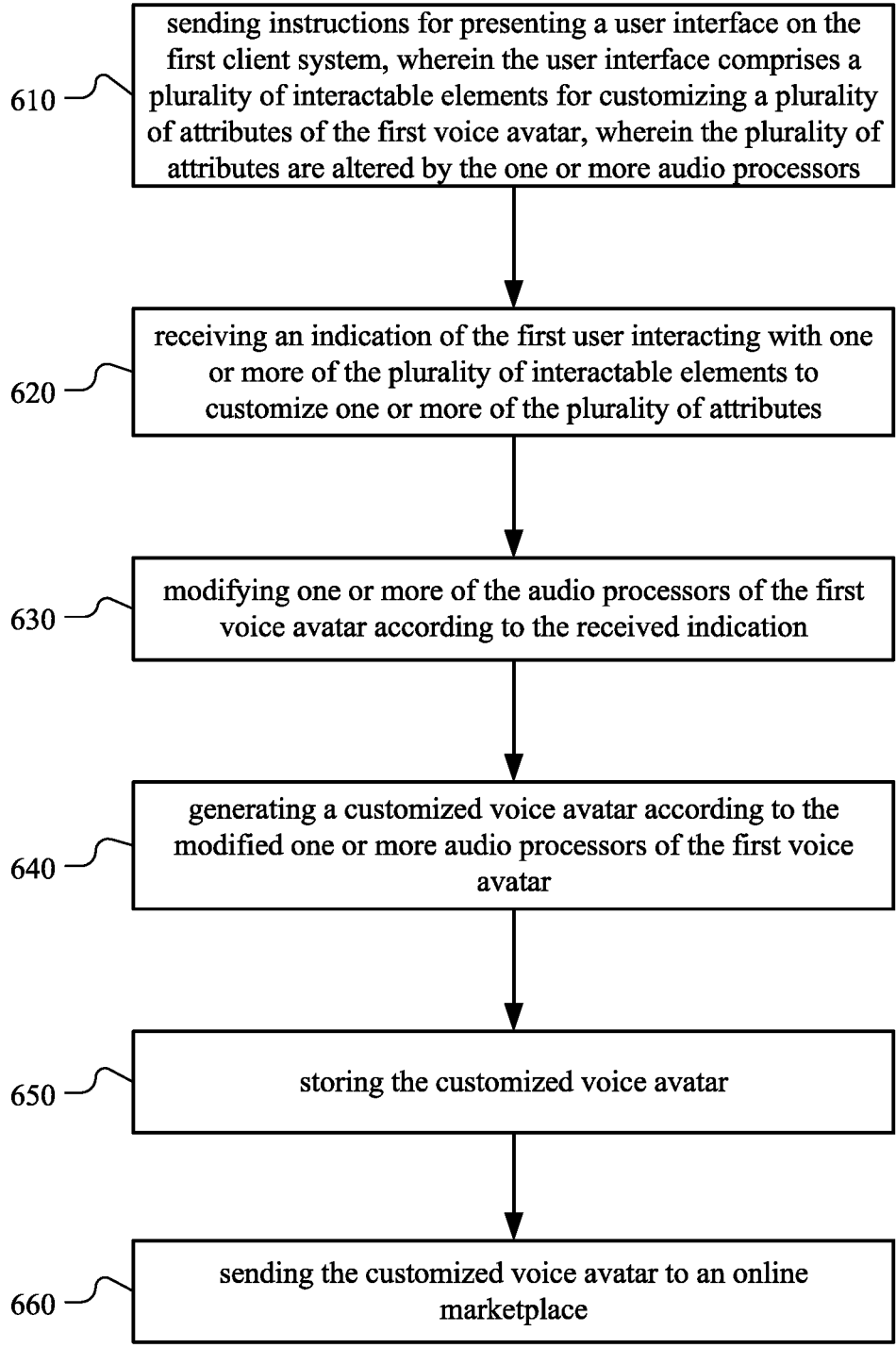
FIG. 6 illustrates an example method for generating a customized voice avatar based on existing voice avatars using a user interface.

FIG. 6 illustrates an example method 600 for generating a customized voice avatar based on existing voice avatars using a user interface. The method may begin at step 610, where the one or more computing systems 108 may send instructions for presenting a user interface on the first client system. The user interface may comprise a plurality of interactable elements for customizing a plurality of attributes of the first voice avatar. The plurality of attributes are altered by the one or more audio processors. At step 620, the one or more computing systems 108 may receive an indication of the first user interacting with one or more of the plurality of interactable elements to customize one or more of the plurality of attributes. At step 630, the one or more computing systems 108 may modify one or more of the audio processors of the first voice avatar according to the received indication. At step 640, the one or more computing systems 108 may generate a customized voice avatar according to the modified one or more audio processors of the first voice avatar. At step 650, the one or more computing systems 108 may store the customized voice avatar. At step 660, the one or more computing systems 108 may send the customized voice avatar to an online marketplace. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating a customized voice avatar based on existing voice avatars using a user interface including the particular steps of the method of FIG. 6, this disclosure contemplates any suitable method for generating a customized voice avatar based on existing voice avatars using a user interface including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
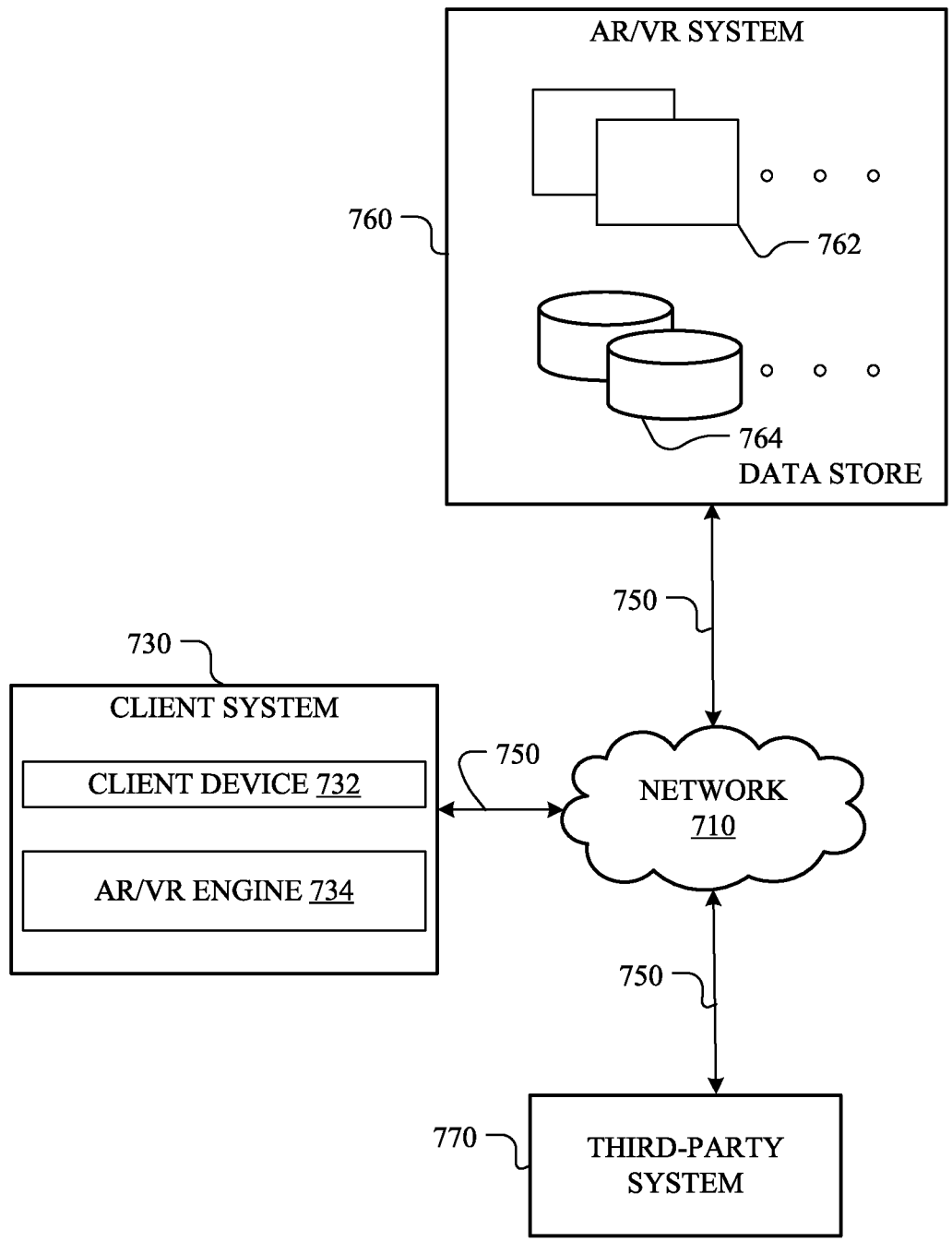
FIG. 7 illustrates an example network environment associated with an AR/VR system.

FIG. 7 illustrates an example network environment 700 associated with an AR/VR system. Network environment 700 includes a client system 730, an AR/VR system 760, and a third-party system 770 connected to each other by a network 710. Although FIG. 7 illustrates a particular arrangement of a client system 730, an AR/VR system 760, a third-party system 770, and a network 710, this disclosure contemplates any suitable arrangement of a client system 730, an AR/VR system 760, a third-party system 770, and a network 710. As an example and not by way of limitation, two or more of a client system 730, an AR/VR system 760, and a third-party system 770 may be connected to each other directly, bypassing a network 710. As another example, two or more of a client system 730, an AR/VR system 760, and a third-party system 770 may be physically or logically co-located with each other in whole or in part. Moreover, although FIG. 7 illustrates a particular number of client systems 730, AR/VR system 760, third-party systems 770, and networks 710, this disclosure contemplates any suitable number of client systems 730, AR/VR system 760, third-party systems 770, and networks 710. As an example and not by way of limitation, network environment 700 may include multiple client systems 730, AR/VR systems 760, third-party systems 770, and networks 710.

This disclosure contemplates any suitable network 710. As an example and not by way of limitation, one or more portions of a network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 710, or a combination of two or more such networks 710.

Links 750 may connect a client system 730, an AR/VR system 760, and a third-party system 770 to a communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout a network environment 700. One or more first links 750 may differ in one or more respects from one or more second links 750.

In particular embodiments, a client system 730 may be any suitable electronic device including hardware, software, or embedded logic components, or a combination of two or more such components, and may be capable of carrying out the functionalities implemented or supported by a client system 730. As an example and not by way of limitation, the client system 730 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual reality (VR) headset, other suitable electronic device, or any suitable combination thereof. In particular embodiments, the client system 730 may be an AR/VR device. This disclosure contemplates any suitable client systems 730. In particular embodiments, a client system 730 may enable a network user at a client system 730 to access a network 710. The client system 730 may also enable the user to communicate with other users at other client systems 730.

In particular embodiments, a client system 730 may include a client device 732. The client device 732 may include rendering device and, optionally, a companion device. The rendering device may be configured to render outputs generated by the AR/VR system 760 to the user. The companion device may be configured to perform computations associated with particular tasks (e.g., communications with the AR/VR system 760) locally (i.e., on-device) on the companion device in particular circumstances (e.g., when the rendering device is unable to perform said computations). In particular embodiments, the client system 730, the rendering device, and/or the companion device may each be a suitable electronic device including hardware, software, or embedded logic components, or a combination of two or more such components, and may be capable of carrying out, individually or cooperatively, the functionalities implemented or supported by the client system 730 described herein. As an example and not by way of limitation, the client system 730, the rendering device, and/or the companion device may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augmented-reality (AR) smart glasses, other suitable electronic device, or any suitable combination thereof. In particular embodiments, one or more of the client system 730, the rendering device, and the companion device may operate as a smart assistant device. As an example and not by way of limitation, the rendering device may comprise smart glasses and the companion device may comprise a smart phone. As another example and not by way of limitation, the rendering device may comprise a smart watch and the companion device may comprise a smart phone. As yet another example and not by way of limitation, the rendering device may comprise smart glasses and the companion device may comprise a smart remote for the smart glasses. As yet another example and not by way of limitation, the rendering device may comprise a VR/AR headset and the companion device may comprise a smart phone.

In particular embodiments, the client device 732 may comprise a web browser, and may have one or more add-ons, plug-ins, or other extensions. A user at a client system 730 may enter a Uniform Resource Locator (URL) or other address directing a web browser to a particular server (such as server 762, or a server associated with a third-party system 770), and the web browser may generate a Hyper Text Transfer Protocol (HTTP) request and communicate the HTTP request to server. The server may accept the HTTP request and communicate to a client system 730 one or more Hyper Text Markup Language (HTML) files responsive to the HTTP request. The client system 730 may render a web interface (e.g., a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the client system 730 (e.g., an HMD) may include an AR/VR engine 734 to provide the AR/VR feature described herein, and may have one or more add-ons, plug-ins, or other extensions. A user at client system 930 may connect to a particular server (such as server 762, or a server associated with a third-party system 770). The server may accept the request and communicate with the client system 730.

In particular embodiments, the AR/VR system 760 may be a network-addressable computing system. The AR/VR system 760 may generate, store, receive, and send AR/VR data, such as, for example, user profile data, concept-profile data, AR/VR information, or other suitable data related to the AR/VR system. The AR/VR system 760 may be accessed by the other components of network environment 700 either directly or via a network 710. As an example and not by way of limitation, a client system 730 may access the AR/VR system 760 using a head-mounted device or a native application associated with the AR/VR system 760 (e.g., a VR game application, a video sharing application, another suitable application, or any combination thereof) either directly or via a network 710. In particular embodiments, the AR/VR system 760 may include one or more servers 762. Each server 762 may be a unitary server or a distributed server spanning multiple computers or multiple datacenters. As an example and not by way of limitation, each server 762 may be a web server, a news server, a mail server, a message server, an advertising server, a file server, an application server, an exchange server, a database server, a proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, the AR/VR system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, an AR/VR system 760, or a third-party system 770 to manage, retrieve, modify, add, or delete, the information stored in data store 764.

In particular embodiments, the AR/VR system 760 may provide users with the ability to take actions on various types of items or objects, supported by the AR/VR system 760. As an example and not by way of limitation, the items and objects may include groups or social networks to which users of the AR/VR system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the AR/VR system 760 or by an external system of a third-party system 770, which is separate from the AR/VR system 760 and coupled to the AR/VR system 760 via a network 710.

In particular embodiments, the AR/VR system 760 may be capable of linking a variety of entities. As an example and not by way of limitation, the AR/VR system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating the AR/VR system 760. In particular embodiments, however, the AR/VR system 760 and third-party systems 770 may operate in conjunction with each other to provide social-networking services to users of the AR/VR system 760 or third-party systems 770. In this sense, the AR/VR system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 770.

In particular embodiments, the AR/VR system 760 also includes user-generated content objects, which may enhance a user's interactions with the AR/VR system 760. User-generated content may include anything a user can add, upload, send, or "post" to the AR/VR system 760. As an example and not by way of limitation, a user communicates posts to the AR/VR system 760 from a client system 730. Posts may include data such as status updates or other textual data, location information, photos, videos, links, music or other similar data or media. Content may also be added to the AR/VR system 760 by a third-party through a "communication channel," such as a newsfeed or stream.

In particular embodiments, the AR/VR system 760 may include a variety of servers, sub-systems, programs, modules, logs, and data stores. In particular embodiments, the AR/VR system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The AR/VR system 760 may also include suitable components such as network interfaces, security mechanisms, load balancers, failover servers, management-and-network-operations consoles, other suitable components, or any suitable combination thereof. In particular embodiments, the AR/VR system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the AR/VR system 760 to one or more client systems 730 or one or more third-party systems 770 via a network 710. The web server may include a mail server or other messaging functionality for receiving and routing messages between the AR/VR system 760 and one or more client systems 730. An API-request server may allow, for example, an one or more computing systems 108 or a third-party system 770 to access information from the AR/VR system 760 by calling one or more APIs. An action logger may be used to receive communications from a web server about a user's actions on or off the AR/VR system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from a client system 730 responsive to a user input comprising a user request received from a client system 730. Authorization servers may be used to enforce one or more privacy settings of the users of the AR/VR system 760. A privacy setting of a user may determine how particular information associated with a user can be shared. The authorization server may allow users to opt in to or opt out of having their actions logged by the AR/VR system 760 or shared with other systems (e.g., a third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
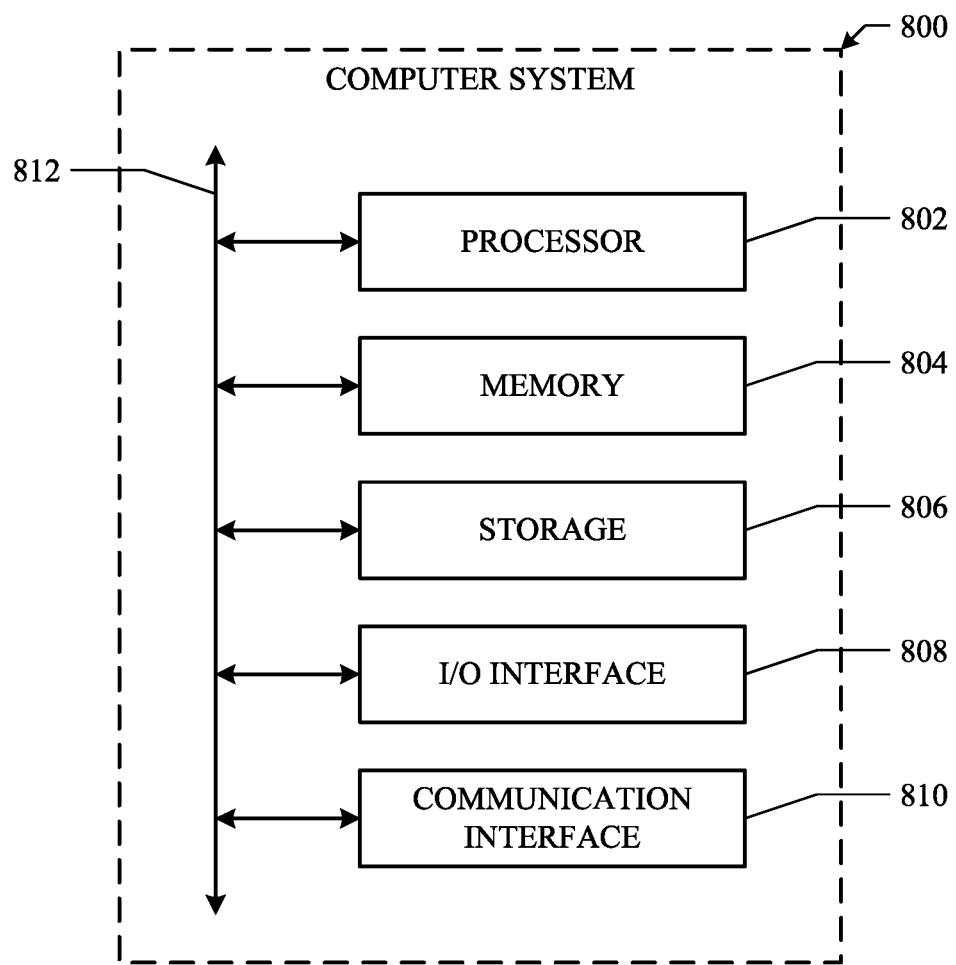
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    accessing a first voice avatar associated with a first user identity of a first user, wherein the first voice avatar comprises a first description of a first audio processing chain to transform voice inputs;
    receiving a first voice input from a first client system of the first user;
    processing the first voice input to generate a first transformed audio corresponding to the first voice input, wherein the first voice input is processed by one or more audio processors, wherein the one or more audio processors are constructed based on the description of the first audio processing chain from the first voice avatar;
    sending the first transformed audio to one or more second client systems of one or more second users for playback;
    receiving an indication of a platform change from a first user platform to a second user platform associated with a second user identity of the first user, wherein the first user platform is associated with the first user identity and the second user platform is associated with the second user; and
    accessing, responsive to the received indication, a second voice avatar associated with the second user identity of the first user.

2. The method of claim 1, wherein the first voice avatar is accessed from an online marketplace.

3. The method of claim 1, wherein the first voice avatar is a text-based file.

4. The method of claim 1, wherein the first voice avatar is a JSON file.

5. The method of claim 1, further comprising:
receiving an indication of an identity change from the first user identity of the first user to a second user identity of the first user;
accessing, responsive to the received indication, a second voice avatar associated with the second user identity of the first user, wherein the second voice avatar comprises a second description of a second audio processing chain to transform the voice inputs;
receiving a second voice input from the first client system of the first user;
processing the second voice input to generate a second transformed audio corresponding to the second voice input, wherein the second voice input is processed by one or more second audio processors that are constructed based on the second description of the second audio processing chain from the second voice avatar; and
sending the second transformed audio to the one or more second client systems of the one or more second users for playback.

6. The method of claim 1, wherein the platform change comprises one or more of an application change, a hardware device change, or an operating system change.

7. The method of claim 1, wherein the first user is associated with a plurality of user identities, and wherein the plurality of user identities are associated with a plurality of voice avatars.

8. The method of claim 1, wherein the one or more computing systems are associated with a plurality of platforms, and wherein the plurality of platforms are associated with a plurality of voice avatars.

9. The method of claim 1, wherein the first voice avatar corresponds to an anonymous mode, and wherein the description of the first audio processing chain comprises instructions for the one or more audio processors to transform the first voice input in the anonymous mode by one or more of altering an audio speed, altering an audio pitch, altering an audio tempo, altering an audio prosody, altering an equalization, reducing a noise, adding a reverb, adding a resonance, adding an echo, or adding a three-dimensional effect.

10. The method of claim 1, further comprising:
sending instructions for presenting a user interface on the first client system, wherein the user interface comprises a plurality of interactable elements for customizing a plurality of attributes of the first voice avatar, wherein the plurality of attributes are altered by the one or more audio processors;
receiving an indication of the first user interacting with one or more of the plurality of interactable elements to customize one or more of the plurality of attributes; and
modifying one or more of the audio processors of the first voice avatar according to the received indication.

11. The method of claim 10, wherein the plurality of attributes comprise one or more of an audio speed, an audio pitch, an audio tempo, an audio prosody, a noise reduction, a reverb, a resonance, an echo, an equalization, or a three-dimensional effect.

12. The method of claim 10, further comprising:
generating a customized voice avatar according to the modified one or more audio processors of the first voice avatar;
storing the customized voice avatar; and
sending the customized voice avatar to an online marketplace.

13. The method of claim 1, wherein the first user is associated with a plurality of extended reality (XR) avatars in an XR environment, and wherein the plurality of XR avatars are associated with a plurality of voice avatars.

14. The method of claim 13, further comprising:
receiving an indication of an XR avatar change from a first XR avatar to a second XR avatar of the plurality of XR avatars in the XR environment, wherein the first XR avatar is associated with the first voice avatar, and wherein the second XR avatar is associated with a second voice avatar; and
accessing, responsive to the received indication, the second voice avatar associated with the second XR avatar of the first user.

15. The method of claim 13, further comprising:
receiving an indication of a voice avatar change from a first voice avatar to a second voice avatar, wherein the first voice avatar is associated with a first XR avatar, and wherein the second voice avatar is associated with a second XR avatar; and
rendering, responsive to the received indication, the second XR avatar for one or more displays associated with the one or more computing systems.

16. One or more computer-readable non-transitory storage media embodying software that is operable when executed to:
access a first voice avatar associated with a first user identity of a first user, wherein the first voice avatar comprises a first description of a first audio processing chain to transform voice inputs;
receive a first voice input from a first client system of the first user;
process the first voice input to generate a first transformed audio corresponding to the first voice input, wherein the first voice input is processed by one or more audio processors, wherein the one or more audio processors are constructed based on the description of the first audio processing chain from the first voice avatar;
send the first transformed audio to one or more second client systems of one or more second users for playback;
receive an indication of a platform change from a first user platform to a second user platform associated with a second user identity of the first user, wherein the first user platform is associated with the first user identity and the second user platform is associated with the second user; and
access, responsive to the received indication, a second voice avatar associated with the second user identity of the first user.

17. The media of claim 16, wherein the software is further operable when executed to:
receive an indication of an extended reality (XR) avatar change from a first XR avatar to a second XR avatar of a plurality of XR avatars in an XR environment, wherein the first XR avatar is associated with the first voice avatar, and wherein the second XR avatar is associated with a second voice avatar; and accessing, responsive to the received indication, the second voice avatar associated with the second XR avatar of the first user.

18. A system comprising: one or more processors; and a non-transitory memory coupled to the processors comprising instructions executable by the processors, the processors operable when executing the instructions to:
- access a first voice avatar associated with a first user, wherein the first voice avatar comprises a first description of a first audio processing chain to transform voice inputs;
- receive a first voice input from a first client system of the first user;
- process the first voice input to generate a first transformed audio corresponding to the first voice input, wherein the first voice input is processed by one or more audio processors, wherein the one or more audio processors are constructed based on the description of the first audio processing chain from the first voice avatar;
- send the first transformed audio to one or more second client systems of one or more second users for playback;
- receive an indication of a platform change from a first user platform to a second user platform associated with a second user identity of the first user, wherein the first user platform is associated with the first user identity and the second user platform is associated with the second user; and
- access, responsive to the received indication, a second voice avatar associated with the second user identity of the first user.

* * * * *